United States Patent
Roshdy et al.

(10) Patent No.: US 12,435,617 B2
(45) Date of Patent: Oct. 7, 2025

(54) MEASURING TORQUE USING SHAFT TWIST IN ELECTRIC SUBMERSIBLE PUMPING SYSTEM MOTORS

(71) Applicant: Baker Hughes Oilfield Operations LLC, Houston, TX (US)

(72) Inventors: Ameen Roshdy, Tulsa, OK (US); Gary Williams, Claremore, OK (US); Mark Bellmyer, Owasso, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 199 days.

(21) Appl. No.: 18/208,429

(22) Filed: Jun. 12, 2023

(65) Prior Publication Data

US 2024/0410267 A1 Dec. 12, 2024

(51) Int. Cl.
*G01L 3/10* (2006.01)
*E21B 47/008* (2012.01)

(52) U.S. Cl.
CPC ............ *E21B 47/008* (2020.05); *G01L 3/109* (2013.01)

(58) Field of Classification Search
CPC .............................. E21B 47/008; G01L 3/109
See application file for complete search history.

(56) References Cited

U.S. PATENT DOCUMENTS

| | | | |
|---|---|---|---|
| 5,265,773 A | 11/1993 | Harada | |
| 5,353,646 A | 10/1994 | Kolpak | |
| 5,591,925 A | 1/1997 | Garshelis | |
| 5,723,794 A | 3/1998 | Discenzo | |
| 6,122,977 A | 9/2000 | Soederholm et al. | |
| 6,260,004 B1 | 7/2001 | Hays et al. | |
| 7,789,171 B2 * | 9/2010 | Grayson | E21B 47/007 175/45 |
| 8,246,251 B1 | 8/2012 | Gardner | |
| 8,528,662 B2 * | 9/2013 | Camp | E21B 47/024 175/45 |
| 8,602,126 B2 * | 12/2013 | Boone | E21B 7/04 175/26 |
| 9,714,568 B2 | 7/2017 | Rendusara et al. | |
| 11,573,139 B2 * | 2/2023 | Arevalo | E21B 7/067 |
| 11,795,937 B2 * | 10/2023 | Semple | F04B 47/06 |
| 2003/0172747 A1 | 9/2003 | Gandrud | |

(Continued)

FOREIGN PATENT DOCUMENTS

| | | |
|---|---|---|
| CN | 201521430 U | 7/2010 |
| JP | 2007093406 A | 4/2007 |

(Continued)

OTHER PUBLICATIONS

International Search Report and Written Opinion for PCT/US2024/033590 mailed Sep. 30, 2024.

*Primary Examiner* — Freddie Kirkland, III
(74) *Attorney, Agent, or Firm* — Baker Hughes Company (57) ABSTRACT

A torque determination system for use in connection with a pumping system includes a first shaft sensor assembly that produces a first shaft revolution completion signal and a second shaft sensor assembly that produces a second shaft revolution completion signal. The torque determination system includes a processor unit configured to determine the torque produced by the motor based on a shaft twist angle calculated by comparing the first shaft revolution completion signal and the second shaft revolution completion signal.

17 Claims, 5 Drawing Sheets

(56) References Cited

U.S. PATENT DOCUMENTS

| | | |
|---|---|---|
| 2004/0049357 A1 | 3/2004 | Delvaux et al. |
| 2008/0315810 A1 | 12/2008 | Akita |
| 2008/0319684 A1 | 12/2008 | Parrish et al. |
| 2009/0266611 A1* | 10/2009 | Camp .................. E21B 7/067 |
| | | 175/45 |
| 2011/0017013 A1 | 1/2011 | Bader |
| 2012/0257989 A1 | 10/2012 | Durham et al. |
| 2013/0181085 A1 | 7/2013 | Turley |
| 2013/0272898 A1 | 10/2013 | Nyayadhish et al. |
| 2018/0231058 A1 | 8/2018 | Nelson et al. |
| 2021/0207596 A1 | 7/2021 | Semple et al. |

FOREIGN PATENT DOCUMENTS

| | | |
|---|---|---|
| KR | 20220025719 A | 3/2022 |
| WO | 2013086822 A1 | 6/2013 |

* cited by examiner

MEASURING TORQUE USING SHAFT TWIST IN ELECTRIC SUBMERSIBLE PUMPING SYSTEM MOTORS

FIELD OF THE INVENTION

This invention relates generally to the field of pumping systems, and more particularly, but not by way of limitation, to a system and method for measuring motor torque.

BACKGROUND

Submersible pumping systems are often deployed into wells to recover petroleum fluids from subterranean reservoirs. Typically, a submersible pumping system includes a number of components, including an electric motor coupled to one or more pump assemblies. Production tubing is connected to the pump assemblies to deliver the petroleum fluids from the subterranean reservoir to a storage facility on the surface. The pump assemblies often employ axially and centrifugally oriented multi-stage turbomachines. Each of the components in a submersible pumping system must be engineered to withstand the inhospitable downhole environment.

The electric motor drives the impellers through a series of interconnected steel shafts that extend through the motor, the seal section and the pump. In some cases, the motor shaft itself may be more than 90 feet long. The torque applied to the pump is an important characteristic that may reflect the performance of the motor and the condition and power consumption of the pump. Unexpected changes to the torque output of the motor may forecast unwanted wear or damage to the pumping system, inefficient operating parameters or conditions, and changes to the wellbore environment.

Notwithstanding the value of monitoring motor torque, the adverse and remote downhole environment makes it difficult to accurately measuring the torque applied by the downhole motor. Conventional strain gauge sensors are not rugged and are susceptible to temperature-based inconsistencies. There is, therefore, a need for an improved system and method for accurately monitoring motor torque in a downhole pumping system. The present disclosure is directed to these and other deficiencies in the prior art.

SUMMARY OF THE INVENTION

Embodiments disclosed herein are generally directed at a torque determination system for use in connection with a pumping system, where the pumping system has a pump driven by a motor that includes a rotatable motor shaft. The torque determination system includes a first shaft sensor assembly that has a first sensor located in a lower portion the motor and a first sensor target secured to the motor shaft in close proximity to the first sensor. The first sensor is configured to output a first sensor shaft revolution completion signal when the first sensor target completes a rotation with the motor shaft. The torque determination system also includes a second shaft sensor assembly that has a second sensor located in the motor in a spaced apart relationship from the first sensor and a second sensor target secured to the motor shaft in close proximity to the second sensor. The second sensor is configured to output a second sensor shaft revolution completion signal when the second sensor target completes a rotation with the motor shaft. The torque determination system further includes a processor unit configured to receive the first sensor shaft revolution completion signal and the second sensor shaft revolution completion signal, and calculate a shaft twist angle based on the timing of the first sensor shaft revolution completion signal and the second sensor shaft revolution completion signal.

In other embodiments, the present disclosure is directed at a method for measuring the torque applied by a motor to a motor shaft connected to a pump within a pumping system. The method includes the step of activating a first shaft sensor assembly that has a first sensor in a first location of the motor and a first sensor target on the motor shaft in close proximity to the first sensor. The method also includes the step of activating a second shaft sensor assembly that has a second sensor in a second location of the motor, wherein the second sensor is spaced apart from the first sensor, and a second sensor target on the motor shaft in close proximity to the second sensor. The method continues with the steps of energizing the motor to cause the motor shaft to rotate, applying a torque load to the motor shaft, producing a first shaft revolution completion signal from the first sensor when the first sensor target completes a revolution on the shaft and producing a second shaft revolution completion signal from the second sensor when the second sensor target completes a revolution on the shaft. In this embodiment, the method concludes with the step of calculating a shaft twist angle as a function of a time shift determined as the difference in the time of the first shaft revolution completion signal and the time of the second shaft revolution completion signal.

In yet other embodiments, the present disclosure is directed to a submersible pumping system that has a pump and a motor configured to drive the pump, where the motor includes a rotatable motor shaft. The pumping system further includes a torque determination system that has a first shaft sensor assembly that produces a first shaft revolution completion signal and a second shaft sensor assembly that produces a second shaft revolution completion signal. The torque determination system includes a processor unit configured to determine the torque produced by the motor in response to the first shaft revolution completion signal and the second shaft revolution completion signal.

WRITTEN DESCRIPTION

Figure 1:
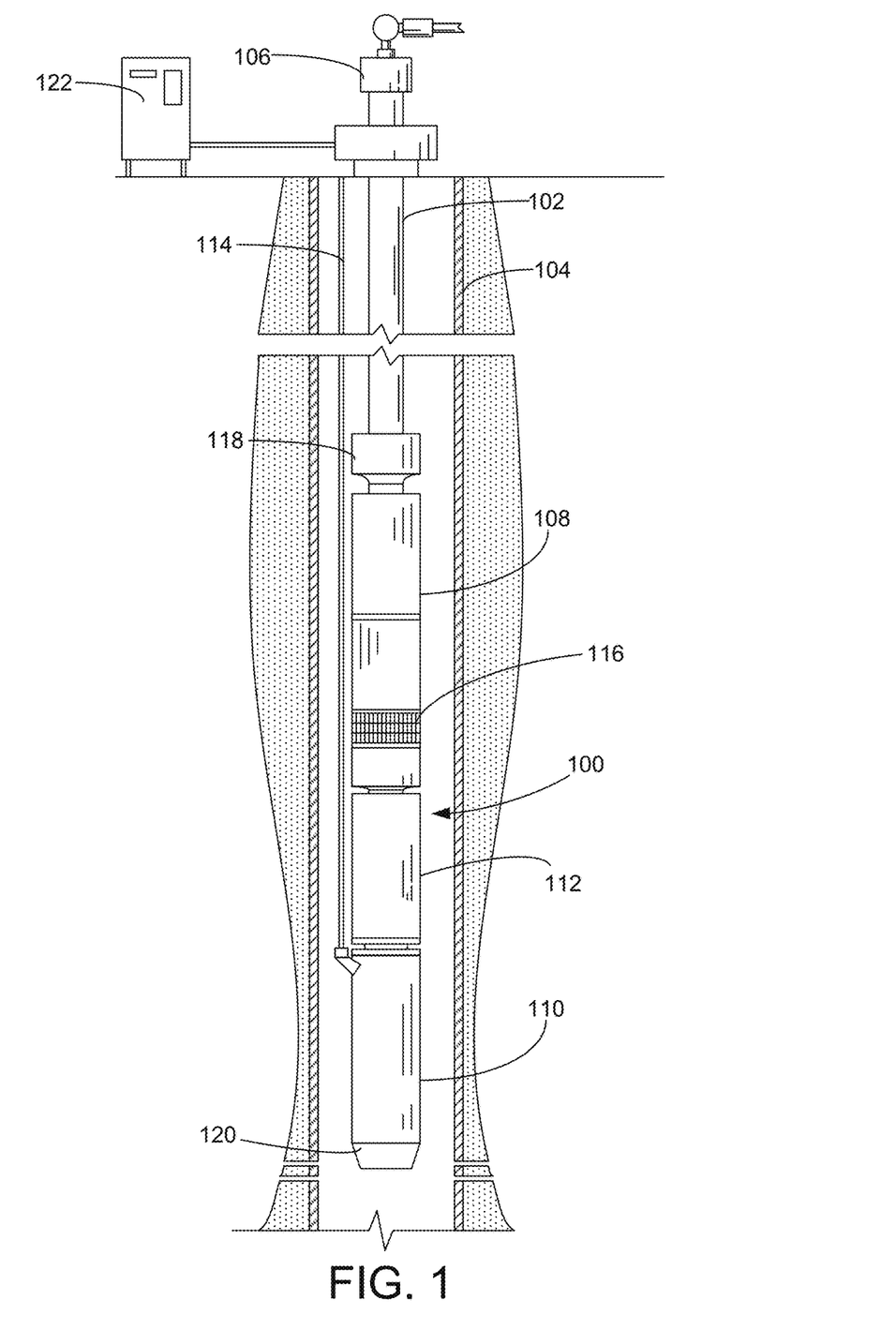
FIG. 1 depicts a submersible pumping system constructed in accordance with exemplary embodiments.

FIG. 1 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 includes a pump 108, a motor 110 and a seal section 112. The seal section 112 shields the motor 110 from mechanical thrust produced by the pump 108. The motor 110 is provided with power from the surface by a power cable 114. Although only one pump 108 and one motor 110 are shown, it will be understood that more can be connected when appropriate. In the embodiment depicted in FIG. 1, the pump 108 is fitted with an intake 116 to allow well fluids from the wellbore 104 to enter the upstream end of the pump 108. The pump 108 includes a discharge 118 on the downstream end of the pump 108. The discharge 118 can be connected directly or indirectly to the production tubing 102. As used herein, the terms "upstream" and "downstream" refer to components or motion following the direction of fluid flow through the pump 108 (e.g., from the intake 116 to the discharge 118).

A gauge module 120 is attached to the lower end of the motor 110 and provides a system for measuring, consolidating, processing, storing and reporting operational and environmental characteristics of the pumping system 100. In some embodiments, the sensor module 120 can be configured to pass communications to and from surface-based controls 122 through the power cable 114. The controls 112 may include, or be incorporated within, a motor drive unit. As depicted in FIG. 1, the motor 110 is positioned between the sensor gauge 120 and the seal section 112. In other embodiments, the sensor gauge 120 can be located elsewhere in the pumping system 100. The sensor module 120 may include internal sensors and circuits for receiving and processing signals from remote sensors configured to measure operational and environmental conditions at the pumping system 100, as well as communications circuits for transmitting and receiving data from equipment 122 located on the surface or elsewhere in the wellbore 104.

Figures 2, 3A, 3B:
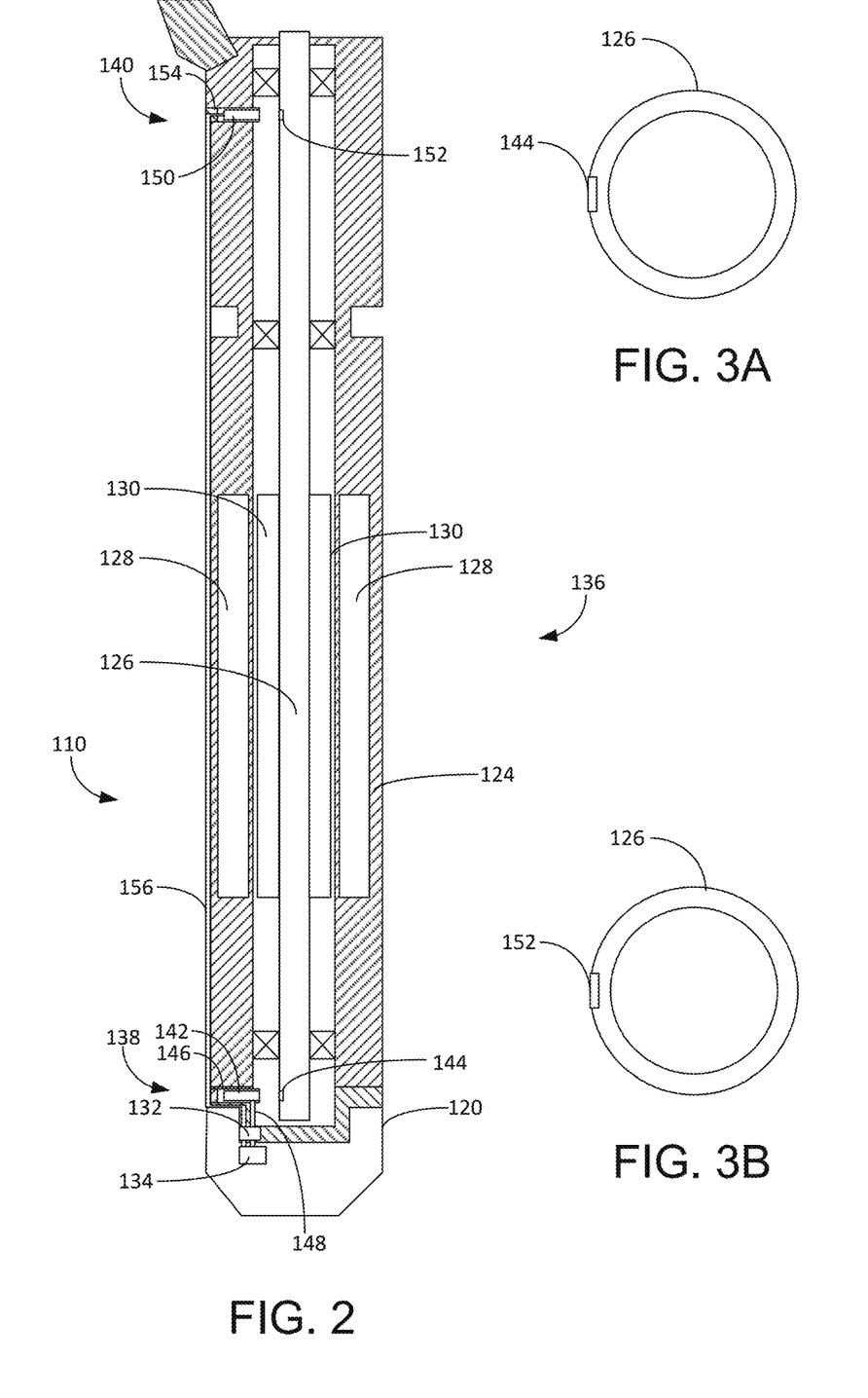
FIG. 2 is a cross-sectional depiction of the motor from the pumping system of FIG. 1.
FIGS. 3A and 3B provide cross-sectional representations of the upper and lower sensor targets on the motor shaft from the motor of FIG. 2.

Turning to FIG. 2, shown therein is a cross-sectional view of the motor 110 and sensor gauge 120. The motor 110 includes a motor housing 124, a motor shaft 126, a stator assembly 128, and a rotor 130. The stator assembly 128 is located adjacent the interior surface of the motor housing 124 and remains fixed relative the motor housing 124. The stator assembly 128 includes a stator core that is formed by passing magnet wire through slots in a plurality of stacked and compressed laminates to form windings or coils.

In induction type motors, power (usually three-phase AC power) is provided to the windings within the stator assembly 128, causing the stator assembly 128 to generate rotating magnetic fields, which induce currents and corresponding magnetic fields in the rotor 130, thereby causing the rotor 130 and the shaft 126 to rotate and drive the pump 108. In the case of a permanent magnet motor, three-phase AC power is provided to the windings within the stator assembly 128, generating rotating magnetic fields as in the induction motor. The rotor 130 of the permanent magnet motor, however, has a set of permanent magnets which cause the rotor 130 to rotate in the rotating magnetic fields generated by the sequentially energized stator assembly 128.

As illustrated in FIG. 2, the sensor gauge 120 is configured to receive electrical power and data signals from the motor 110. A wye-point or other power connection 132 can be used to provide power from the motor 110 to the sensor gauge 120. In some embodiments, the power connection 132 includes leads and terminals at the interface of the motor 110 and sensor gauge 120 that provide an electrical connection without the need for separate wiring. The sensor gauge 120 includes a processor unit 134 that is configured to process signals from the motor 110.

The motor 110 also includes a torque determination system 136 configured to measure the torque output by the motor 110. The torque determination system 136 includes a first shaft sensor assembly 138 and a second shaft sensor assembly 140. In the embodiment depicted in FIG. 2, the first shaft sensor assembly 138 is located in a lower portion of the motor 110 proximate the stator assembly 128 and rotor assembly 130, while the second shaft sensor assembly 140 is located in an upper portion of the motor 110 proximate the seal section 112. Thus, in the embodiment depicted in FIG. 2, the first shaft sensor assembly 138 is a "lower shaft sensor assembly 138" and the second shaft sensor assembly 140 is an "upper shaft sensor assembly 140."

The first shaft sensor assembly 138 includes a first sensor 142 and a corresponding first sensor target 144. The first sensor 142 is located in a first sensor bore 146 within the lower portion of the motor housing 124. As best indicated in FIG. 3A, the first sensor target 144 is located at a discrete location on the outside of the motor shaft 126 or integrated into the motor shaft 126. The first sensor target 144 is located at a point along the length of the motor shaft 126 that places the first sensor target 144 in a laterally spaced apart relationship with the first sensor 142. In this way, the first sensor target 144 is located on a lower end of the motor shaft 126. A first sensor harness 148 connects the first sensor 142 to sensor gauge 120 with one or more wires that are capable of transmitting signals and power between the sensor gauge 120 and the first sensor 142.

In exemplary embodiments, the first sensor 142 is a non-contact sensor that is configured to detect the proximity of the first sensor target 144 on the rotating motor shaft 126. Suitable non-contact sensors include inductive magnetic proximity sensors, Hall effect sensors and optical sensors. For magnetic field-based sensors, each complete rotation of the motor shaft 126 is identified by detecting the maximum signal strength measured by the first sensor 142 as the first sensor target 144 rotates in varying proximity to the stationary first sensor 142. For optical sensors, each complete rotation can be determined as the indicia of the first sensor target 144 passes inside the detection window of the first sensor 142. In each case, the first sensor 142 is configured to output a signal based on the oscillating proximity of the first sensor target 144 to the first sensor 142 as the first sensor target 144 rotates with the motor shaft 126 inside the motor housing 124. The shaft revolution completion signal from the first sensor 142 can be discrete, e.g., a signal for each completed revolution of the first sensor target 144, or continuous, e.g., a signal of varying amplitude based on the changing proximity of the first sensor target 144 to the first sensor 142 where some feature of the signal (e.g., a peak) represents the shaft revolution completion signal.

The second shaft sensor assembly 140 includes a second sensor 150 and a corresponding second sensor target 152. The second sensor 150 is located in a second shaft sensor bore 154 within the upper portion of the motor housing 124. As best indicated in FIG. 3B, the second sensor target 152 is located at a discrete location on the outside of the motor shaft 126 or integrated into the motor shaft 126. The second sensor target 152 is located at a point along the length of the motor shaft 126 that places the second sensor target 152 in a laterally spaced apart relationship with the second sensor 150. In this way, the second sensor target 152 is located on an upper end of the motor shaft 126, in a spaced apart relationship from the first sensor target 144. A second sensor harness 156 connects the second sensor 150 to the sensor gauge 120 with one or more wires that are capable of transmitting signals and power between the sensor gauge 120 and the second sensor 150.

In some embodiments, the second sensor harness 156 extends along the outside of the motor housing 124. In other embodiments, the second sensor harness 156 extends through the inside of the motor 110. For example, the second sensor harness 156 can be routed through the stator assembly 128, between the housing 124 and the stator assembly 128, or through another interior component of the motor 110. In some embodiments a single internal or external harness connects the first sensor 142 and the second sensor 150 to the sensor gauge 120.

In exemplary embodiments, the second sensor 150 is a non-contact sensor that is configured to detect the proximity of the second sensor target 152 on the rotating motor shaft 126. Suitable non-contact sensors include inductive magnetic proximity sensors, Hall effect sensors and optical sensors. For magnetic field-based sensors, each complete rotation of the motor shaft 126 is identified by detecting the maximum signal strength measured by the second sensor 150 as the second sensor target 152 rotates in varying proximity to the stationary second sensor 150. For optical sensors, each complete rotation can be determined as the indicia of the second sensor target 152 passes inside the detection window of the second sensor 150. In each case, the second sensor 150 is configured to output a shaft revolution completion signal based on the oscillating proximity of the second sensor target 152 to the second sensor 150 as the second sensor target 152 rotates with the motor shaft 126 inside the motor housing 124. Like the first sensor 142, the shaft revolution completion signal from the second sensor 142 can be discrete, e.g., a signal for each completed revolution of the second sensor target 152, or continuous, e.g., a signal of varying amplitude based on the changing proximity of the second sensor target 152 to the second sensor 150, where some feature of the continuous signal represents the completion of the shaft revolution. It will be appreciated that the torque determination system 136 can include more than two sensor assemblies and that multiple types of sensor assemblies can be used together, e.g., optical sensors in combination with inductive proximity sensors.

The output signals from the first sensor 142 and second sensor 150 can be used to derive the rotational speed of the motor shaft 126 based on the amount of time it takes for the first and second sensor targets 144, 152 to complete one revolution as detected by the first and second sensors 142, 150, respectively. Moreover, torque-induced twist of the motor shaft 126 between the first and second sensor targets 144, 152 can be determined by detecting a shift in the timing of the shaft revolution completion signals from the first and second sensors 142, 150.

The shift in the timing of the first and second sensors 142, 150 can be determined by initially calibrating the first and second shaft sensor assemblies 138, 140 such that when the motor shaft 126 is not under load the first sensor 142 detects the first sensor target 144 at substantially the same time as the second sensor 150 detects the second sensor target 152. The resulting shaft revolution completion signals produced by the first and second shaft sensor assemblies 138, 140 should be substantially synchronized. Once the motor shaft 126 is subjected to a torque load, the motor shaft 126 may twist along the longitudinal axis and the position of the second sensor target 152 will change with respect to the first sensor target 144. This positional change will create an offset in the timing of the detection of the first and second sensor targets 144, 152 by the first and second sensors 142, 150, respectively. The extent of shaft twist can be measured in angular degrees as a function of the time shift ($\Delta T$) between the shaft revolution completion signals produced by the first and second sensors 142, 150. Because the first and second sensors 142, 150 are initially calibrated to produce shaft revolution completion signals at the same time when the motor shaft 126 is not under a torque load, any separation or gap between the shaft revolution completion signals is indicative of a change in the relative positions of the first and second sensor targets 144, 152 based on a twist of the motor shaft 126.

Alternatively, the torque determination system 136 can be configured to identify shaft twist without initially aligning the first and second shaft sensor assemblies 138, 140. In these embodiments, the shaft revolution completion signals produced by the first and second sensors 142, 150 are used to identify an initial time gap between the shaft revolution completion signals output by the first and second sensors 142, 150 before the motor shaft 126 is subjected to a torque load. Once a torque load is applied to the motor shaft 126, the torque determination system 136 can identify a second time gap between the shaft revolution completion signals from the first and second sensors 142, 150, where the second time gap may be larger or smaller than the first time gap depending on the direction in which the motor shaft 126 twists and the relative starting positions of the first and second sensor targets 144, 152. The absolute value of the change in the timing of the shaft revolution completion signals ($\Delta T$) can be used to determine the extent to which the motor shaft 126 has twisted under the torque load.

Figure 4:
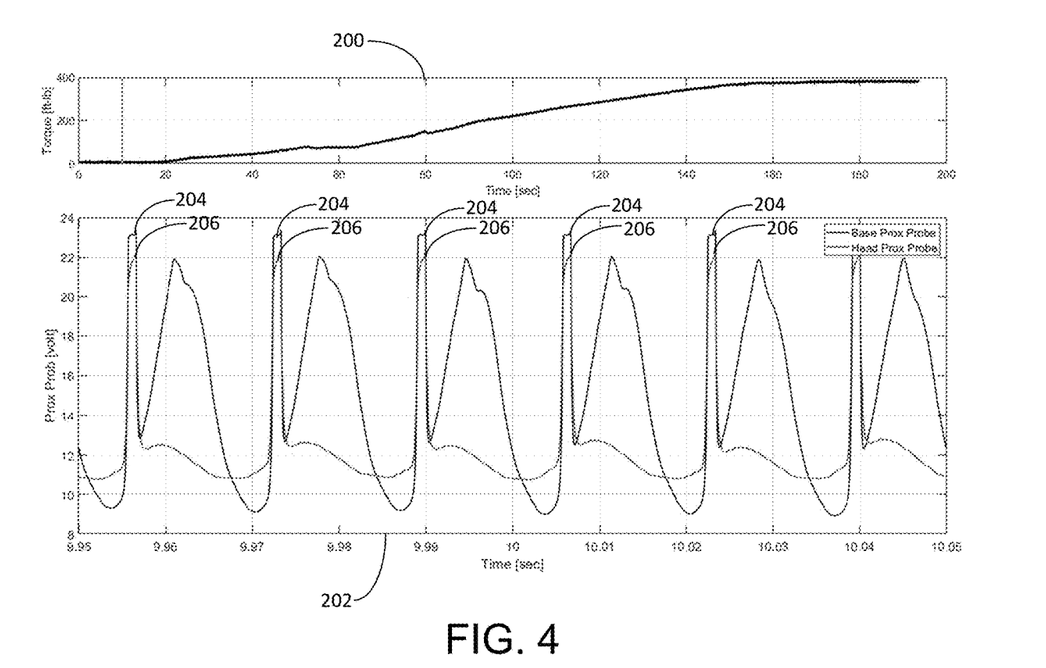
FIG. 4 presents a graph of motor torque over a measurement period with a focused graph directed at the corresponding proximity sensor output within a discrete window within the measurement period in which the motor is not producing torque.
Figure 5A:
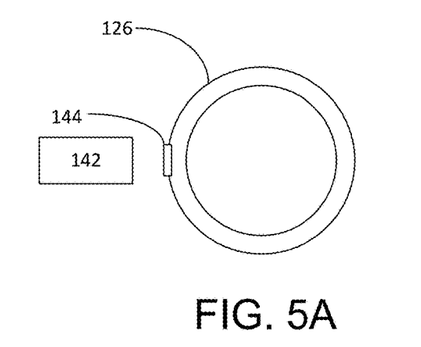
FIGS. 5A and 5B are representations of the rotational alignment of the upper and lower sensor targets at the discrete window depicted in FIG. 4.
Figure 5B:
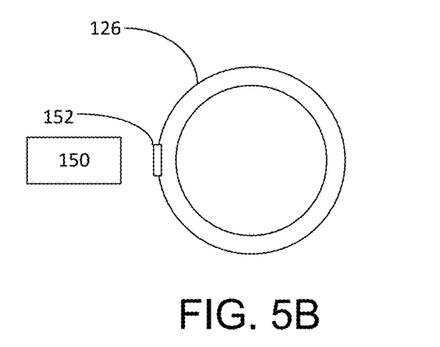

Referring now to FIG. 4, shown therein is a torque graph 200 that displays torque (ft-lb) over a period of time (200 seconds). FIG. 4 also includes a proximity signal graph 202 of the output of the first and second sensors 142, 150 over a focus period within the 200 second test period. As depicted in FIG. 4, at approximately 10 seconds into the test period, the motor shaft 126 is not subjected to a significant torque load. The peak output 204 of the first sensor 142 is aligned with the peak output 206 of the second sensor 150 throughout the focused period, which indicates an alignment and synchronization of the shaft revolution completion signals produced by the first and second sensors 142, 150. Thus, the first sensor target 144 and second sensor target 152 are rotationally aligned before the motor shaft 126 experiences any shaft twist. For illustration purposes, FIGS. 5A and 5B depict the relative positions of the first and second sensor targets 144, 152 during the focus period.

Figure 6:
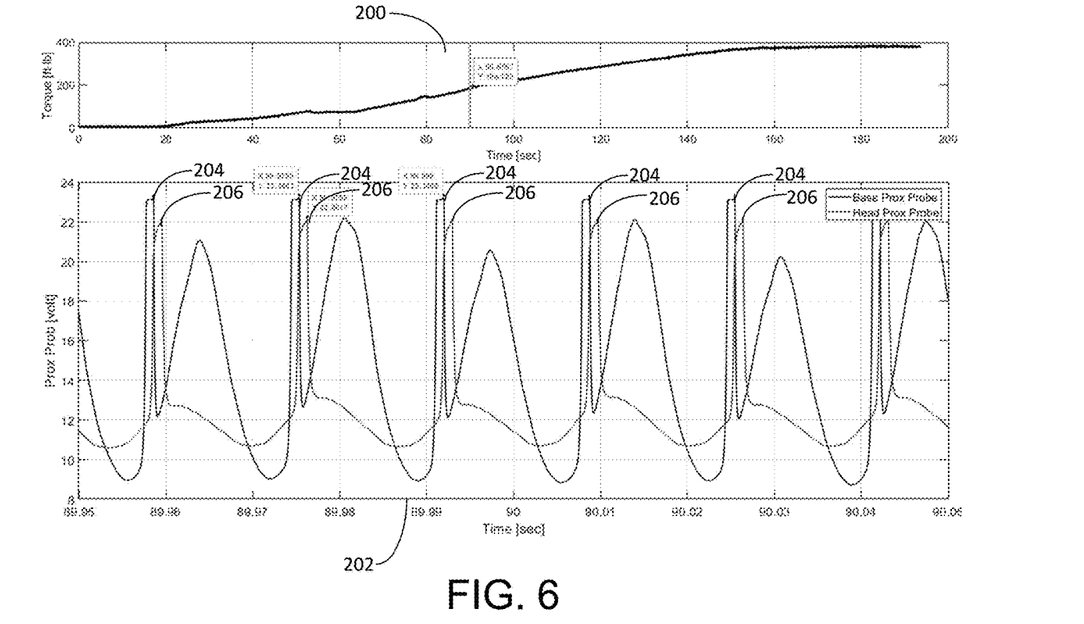
FIG. 6 presents a graph of motor torque over a measurement period with a focused graph directed at the corresponding proximity sensor output within a discrete window within the measurement period in which the motor is producing a moderate amount of torque.
Figure 7A:
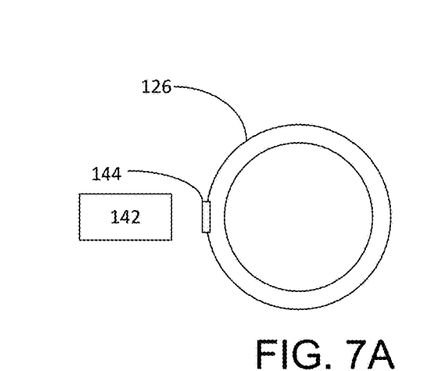
FIGS. 7A and 7B are representations of the rotational offset of the upper and lower sensor targets at the discrete window depicted in FIG. 6.
Figure 7B:
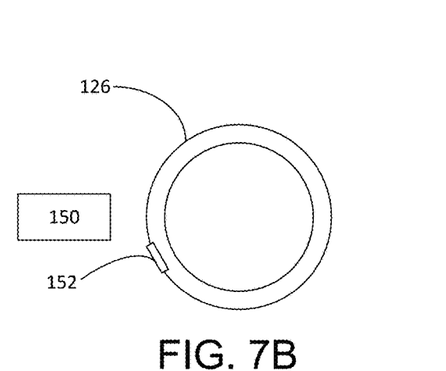

The proximity signal graph 202 of FIG. 6 depicts the output of the first and second sensors 142, 150 at approximately 90 seconds into the test period. As illustrated in the torque graph 200, the motor shaft 126 is now subjected to about 200 ft-pounds of torque. The torque load has resulted in a modest axial twist of the motor shaft 126, which has caused a shift or gap between the respective shaft revolution completion signals produced by the first sensor 142 and the second sensor 150 because the second sensor target 152 now lags the first sensor target 144 by about 20 degrees, as illustrated in FIGS. 7A and 7B.

Figure 8:
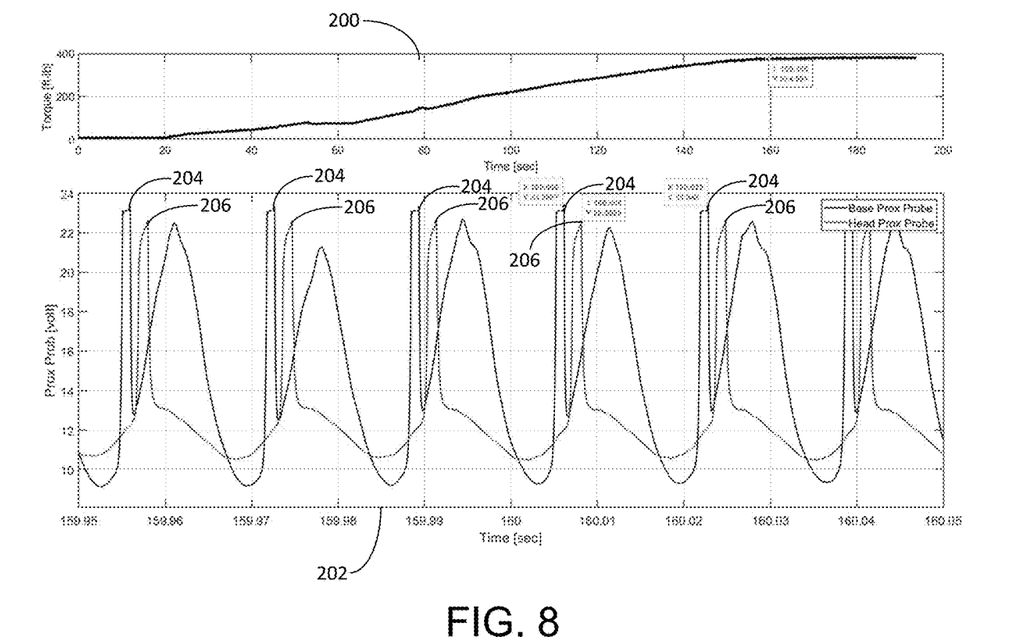
FIG. 8 presents a graph of motor torque over a measurement period with a focused graph directed at the corresponding proximity sensor output within a discrete window within the measurement period in which the motor is producing maximum torque.
Figure 9A:
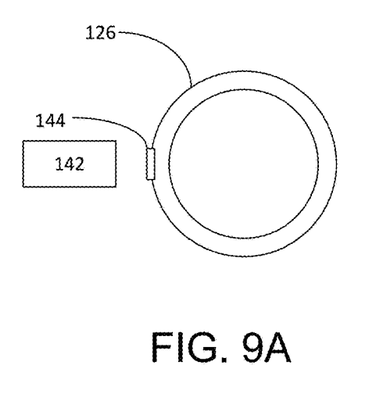
FIGS. 9A and 9B are representations of the rotational offset of the upper and lower sensor targets at the discrete window depicted in FIG. 8.
Figure 9B:
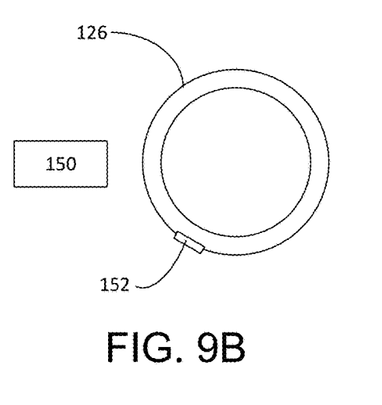

FIG. 8 provides the output of the first and second sensors 142, 150 at approximately 160 seconds into the test period when the motor shaft 126 is subjected to about 400 ft-pounds of torque. The torque load has caused a significant degree of axial twist in the motor shaft 126, which has increased the time shift or gap between the shaft revolution completion signals generated by the first sensor 142 and the second sensor 150. As illustrated in FIGS. 9A and 9B, the second sensor target 152 now lags the first sensor target 144 by about 40 degrees. It will be appreciated that the torque and proximity values depicted in FIGS. 4-9 are merely demonstrative and should not be construed or interpreted as limiting the scope of the exemplary embodiments.

The degree of twist in the motor shaft 126 can be determined as a function of: (i) the shift in the timing of the shaft revolution completion signals produced by the first and second sensors 142, 150; and (ii) the total shaft revolution time according to the following equation (1):

$$\text{Shaft Twist Angle} = \frac{\text{Time Shift}}{\text{Time of Revolution}} \times 360 \quad (1)$$

The time shift numerator is calculated by looking at an absolute change in the timing of the shaft revolution completion signals produced by the first and second sensor assemblies 138, 140. As the motor shaft 126 undergoes an axial twist based on the application of torque to the motor shaft, the second sensor target 152 rotates out of alignment with the first sensor target 144 thereby inducing a change by either delaying or advancing the timing between the shaft revolution completion signals, i.e., the "time shift" produced by the first and second sensor assemblies 138, 140. The "time of revolution" denominator is the time it takes for the motor shaft 126 to complete a single revolution, as measured by either or both of the first and second sensor assemblies 138, 140. Multiplying the quotient of the time shift and the time of revolution by 360 yields the angular twist in the motor shaft 126 in degrees. It will be appreciated that the processing of the first shaft revolution completion signal and the second shaft revolution completion signal can be accomplished by the processor unit 134 or another processor located in the sensor gauge 120, elsewhere in the pumping system 100 or in control equipment located on the surface.

Once the shaft twist angle has been identified, the torque applied to the motor shaft can be calculated using a predetermined torque-to-twist ratio based on the amount of shaft twist caused by a range of applied torques for a given motor shaft 126. As an example, for a given motor shaft 126, the torque applied to the motor shaft 126 can be calculated by dividing the shaft twist angle by a correction factor according to equation (2):

$$\text{Torque} = \frac{\text{Shaft Twist Angle}}{\text{Correction Factor}} \quad (2)$$

The correction factor can be determined for each type and size of motor shaft 126 using test procedures during manufacturing. For some motor shafts, the correction factor is between about 0.100 and about 0.200. In some particular embodiments, the correction factor is about 0.119 (degrees of shaft angle twist/ft-pound torque). These calculations can be performed by the processor unit 134 or by another processor within the pumping system 100 or within control equipment on the surface.

Thus, in exemplary embodiments and as described above, the torque determination system 136 includes a system and method for determining the torque load applied to the motor 110 operating in the wellbore 104 based on the amount of twist induced in the motor shaft 126. Once the torque load on the motor shaft 126 has been determined, the efficiency of the motor 110 can be evaluated by comparing the theoretical power output of the motor 110 based on the drive signal applied to the motor 110 with the actual power output of the motor 110 based on the calculated torque and rotational speed, where power is determined as the product of torque and rotational speed. The ability to accurately measure the torque produced by the motor 110 in the downhole environment allows the operator to monitor the efficiency of the motor 110 as a function of the actual and expected power output. A decrease in the efficiency of the motor 110 can indicate a change in the conditions within the wellbore 104 or potential or predicted damage to the pumping system 100.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A torque determination system for use in connection with a pumping system that has a pump driven by a motor that includes a rotatable motor shaft, the torque determination system comprising:
    a first shaft sensor assembly, wherein the first shaft sensor assembly comprises:
        a first sensor located in a lower portion the motor;
        a first sensor target secured to the motor shaft in close proximity to the first sensor; and
        wherein the first sensor is configured to output a first sensor shaft revolution completion signal when the first sensor target completes a rotation with the motor shaft;
    a second shaft sensor assembly, wherein the second shaft sensor assembly comprises:
        a second sensor located in the motor in a spaced apart relationship from the first sensor;
        a second sensor target secured to the motor shaft in close proximity to the second sensor; and wherein the second sensor is configured to output a second sensor shaft revolution completion signal when the second sensor target completes a rotation with the motor shaft; and a processor unit configured to receive the first sensor shaft revolution completion signal and the second sensor shaft revolution completion signal, and wherein the processor unit is further configured to calculate a shaft twist angle based on the timing of the first sensor shaft revolution completion signal and the second sensor shaft revolution completion signal after the first and second sensor assemblies have been calibrated by: (i) either aligning the first sensor target and the second sensor target to synchronize the first and second shaft revolution completion signals; or (ii) determining an initial time gap between the first and second shaft revolution completion signals.

2. The torque determination system of claim 1, wherein the pumping system further comprises a sensor gauge and wherein the processor unit is located inside the sensor gauge.

3. The torque determination system of claim 1, wherein the processor unit is configured to calculate the torque output by the motor as a function of the shaft twist angle.

4. The torque determination system of claim 3, wherein the processor unit is configured to calculate the torque output by the motor by dividing the shaft twist angle by a correction factor.

5. The torque determination system of claim 1, wherein the first sensor is selected from the group consisting of inductive magnetic proximity sensors and optical sensors.

6. The torque determination system of claim 5, wherein the second sensor is selected from the group consisting of inductive magnetic proximity sensors and optical sensors.

7. The torque determination system of claim 6, wherein the first sensor target is connected to a lower end of the motor shaft.

8. The torque determination system of claim 7, wherein the second sensor target is connected an upper end of the motor shaft at a spaced apart distance from the first sensor target.

9. A method for measuring the torque applied by a motor to a motor shaft connected to a pump within a pumping system, the method comprising the steps of:
activating a first shaft sensor assembly, wherein the first shaft sensor assembly comprises:
a first sensor in a first location of the motor; and
a first sensor target on the motor shaft in close proximity to the first sensor;
activating a second shaft sensor assembly, wherein the second shaft sensor assembly comprises:
a second sensor in a second location of the motor, wherein the second sensor is spaced apart from the first sensor; and
a second sensor target on the motor shaft in close proximity to the second sensor;
energizing the motor to cause the motor shaft to rotate;
calibrating the first and second sensor assemblies by aligning the first sensor target and the second sensor target;
producing a first shaft revolution completion signal from the first sensor when the first sensor target completes a revolution on the shaft;
producing a second shaft revolution completion signal from the second sensor when the second sensor target completes a revolution on the shaft, wherein the first and second shaft revolution signals are initially substantially synchronized;

applying a torque load to the motor shaft; and
calculating a shaft twist angle as a function of a time shift determined as the difference in the time of the first shaft revolution completion signal and the time of the second shaft revolution completion signal.

10. The method of claim 9, wherein the step of determining the shaft twist angle further comprises the step of finding the quotient of the time shift and a time of revolution, wherein the time of revolution is determined by measuring how long it takes the motor shaft to complete one revolution.

11. The method of claim 10, further comprising the step of calculating a torque output value for the motor.

12. The method of claim 11, wherein the step of calculating the torque output value for the motor comprises applying a correction factor to the shaft twist angle.

13. The method of claim 11, further comprising the step of determining an efficiency for the motor based on the calculated torque output value for the motor and a rotational speed of the motor shaft.

14. The method of claim 13, wherein the step of determining an efficiency for the motor comprises:
calculating an actual power output for the motor based on the calculated torque output value for the motor; and
comparing the actual power output for the motor with a theoretical power output for the motor, where the theoretical power output is determined as a function of drive current applied to the motor.

15. A submersible pumping system comprising:
a pump;
a motor configured to drive the pump, wherein the motor includes a rotatable motor shaft; and
a torque determination system, the torque determination system comprising:
a first shaft sensor assembly that produces a first shaft revolution completion signal, wherein the first shaft sensor assembly comprises a first sensor located in a lower portion the motor and a first sensor target secured to the motor shaft in close proximity to the first sensor;
a second shaft sensor assembly that produces a second shaft revolution completion signal, wherein the second shaft sensor assembly comprises a second sensor located in the motor in a spaced apart relationship from the first sensor and a second sensor target secured to the motor shaft in close proximity to the second sensor; and
a processor unit configured to determine the torque produced by the motor in response to the first shaft revolution completion signal and the second shaft revolution completion signal after the first and second sensor assemblies have been calibrated by: (i) either aligning the first sensor target and the second sensor target to synchronize the first and second shaft revolution completion signals; or (ii) determining an initial time gap between the first and second shaft revolution completion signals.

16. The submersible pumping system of claim 15, wherein the processor unit is configured to calculate a shaft twist angle based on the timing of the first sensor shaft revolution completion signal and the second sensor shaft revolution completion signal.

17. A method for measuring the torque applied by a motor to a motor shaft connected to a pump within a pumping system, the method comprising the steps of:
activating a first shaft sensor assembly, wherein the first shaft sensor assembly comprises:
a first sensor in a first location of the motor; and a first sensor target on the motor shaft in close proximity to the first sensor;
activating a second shaft sensor assembly, wherein the second shaft sensor assembly comprises:
　a second sensor in a second location of the motor, wherein the second sensor is spaced apart from the first sensor; and
　a second sensor target on the motor shaft in close proximity to the second sensor;
energizing the motor to cause the motor shaft to rotate;
producing a first shaft revolution completion signal from the first sensor when the first sensor target completes a revolution on the shaft;
producing a second shaft revolution completion signal from the second sensor when the second sensor target completes a revolution on the shaft;
calibrating the first and second shaft sensor assemblies by identifying an initial time gap between the first and second shaft revolution completion signals;
applying a torque load to the motor shaft;
determining a second time gap between the first and second shaft revolution completion signals after the torque has been applied to the motor shaft; and
calculating a shaft twist angle as a function of a time shift determined as the difference between the initial time gap and the subsequent time gap.

\* \* \* \* \*